United States Patent [19]
Skelton et al.

[11] Patent Number: 5,224,288
[45] Date of Patent: Jul. 6, 1993

[54] PESTICIDAL BLANKET

[75] Inventors: John Skelton, Sharon; Andrew B. Jeffery, North Quincy, both of Mass.

[73] Assignee: Albany International Corp., Albany, N.Y.

[21] Appl. No.: 853,936

[22] Filed: Mar. 19, 1992

[51] Int. Cl.⁵ ............................................. A01M 1/20
[52] U.S. Cl. .................................................... 43/131
[58] Field of Search .................. 43/124, 131; 428/289, 428/907

[56] References Cited

U.S. PATENT DOCUMENTS

| | | | |
|---|---|---|---|
| 2,315,772 | 4/1943 | Closs | 43/131 |
| 2,899,771 | 8/1959 | Burris | 43/131 |
| 2,952,938 | 9/1960 | Abrams | 43/131 |
| 3,295,246 | 1/1967 | Landsman | 43/131 |
| 3,767,785 | 10/1973 | Bordenca | 43/131 |
| 3,837,988 | 9/1974 | Hennen | 428/92 |
| 3,931,692 | 1/1976 | Hermanson | 43/131 |
| 4,103,450 | 8/1978 | Whitcomb | 43/131 |
| 4,976,062 | 12/1990 | Rutledge | 43/131 |
| 5,028,471 | 7/1991 | Plischke | 428/907 |

*Primary Examiner*—Kurt C. Rowan
*Attorney, Agent, or Firm*—Kane, Dalsimer, Sullivan, Kurucz, Levy, Eisele and Richard

[57] ABSTRACT

A pesticidal blanket, which may be used as a liner for a building excavation to protect the building to be constructed from infestation by termites and other insect pests, takes the form of a foraminous, fibrous membrane. The membrane comprises an assembly of fibers or filaments. The assembly has an average void volume of less than 85% when measured under a pressure of 10 kPa (1.45 psi). The fibers in the assembly have an average fiber size of less than 6 denier, and are coated with an insecticidal substance when the pesticidal blanket is installed at the building site.

4 Claims, 3 Drawing Sheets

PESTICIDAL BLANKET

BACKGROUND OF THE INVENTION

1. Field of the Invention

The present invention relates to an apparatus for controlling the infestation of buildings by insect pests, and, more particularly, to a pesticidal blanket which may be disposed as a liner in an excavation prior to the construction of building therein.

2. Description of the Prior Art

Insect pest control devices comprising some form of bonded textile fibers coated with an insecticide are known in the art. For example, U.S. Pat. No. 4,103,450 to Whitcomb shows an insecticidal device, which uses a lofty bonded web of textile fibers as a scaffold for insecticidal materials, which may subsequently volatilize therefrom into the ambient air. The device purports to permit control over the location, distribution and dispersal of the volatile insecticide deployed therein, and may be simply discarded when the quantity of the insecticide remaining therein falls below an effective level. The device is said to have a number of advantages, particularly for household applications, because it may be deployed readily in small spaces behind appliances which may attract insects. Because the insects in question may actually crawl through the interstices between the textile fibers in the lofty assembly, thereby coming into prolonged direct physical contact with the insecticide being used, the Whitcomb device is highly efficient in its use of the insecticide.

As may be observed, the emphasis in the Whitcomb pat is on a lofty, resilient, highly porous structure which provides an effective, but temporary, means of controlling domestic insect pests in the interior of a house. However, the solution to problems encountered in external, or outdoor, insect control requires a totally different approach. example, in many parts of the world, termites are endemic, and, as cellulose forms their principal food material, the extent of the damage that they can cause to wooden structures is well-known. Typically, termite colonies form nests underground in the soil near ground level, in a stump or other source of timber, or in the trunk of a living tree. Colonees may persist for years and may attain populations running into millions.

Termite attacks originate from the nest Timber lying on or buried, partially or completely, in the ground may be reached by underground foraging galleries. Attacks may also be carried out well above the ground surface via access passages constructed by the termites from mud or earth on a concrete or brick building foundation.

Both the building and its contents may be provided with significant protection by means of a chemical soil barrier which prevents the attacking termites from reaching wooden components. The conventional practice is to treat the soil surrounding a building foundation and footing with any one of a number of well-known chemicals. Chemicals such a aldrin, chlordane, dieldrin and heptachlor may be sprayed on the soil surface by low pressure spray equipment. Alternatively, vertical chemical barriers may be installed by excavating trenches, by treating the exposed trench and by refilling the trench with treated soil, or by rod injection.

In addition to spraying soil with toxic chemicas, other practitioners in the field have proposed insecticidal barriers, including barriers against termite for use around building structures. For example, U.S. Pat. No. 2,899,771 discloses a flexible vapor barrier carrying a layer of water-emulsifiable insecticide. The insecticide in question is carried in a flexible, relatively thin, water-soluble substance, such as "Polyox". U.S. Pat. No. 2,139,225 shows a paper which is coated with arsenate of lead mixed into a paint, whose base is mineral pitch or asphalt. A felt paper in sheet form is impregnated with the mixture by application to one or both surfaces thereof. After the paper has dried, it is packaged and thereafter may be used whenever desired in the same manner as ordinary felt paper, i.e., it ca be laid under floors, or placed between foundations and superstructures, or between the walls of buildings and roofs.

An interesting alternative approach to the provision of an effective termite barrier for new construction is described in International Patent Publication No. WO 90/14004 This publication describes a method of preventing termite damage by providing at the building site a flexible, untreated blanket which is used, for example, to line a building excavation, and then is impregnated with a suitable insecticide. The new construction is then built over the impregnated blanket. The fiber assembly is not described in great detail in this publication. In particular, International Patent Publication No. WO 90/14004 teaches nothing about the fiber density of the fiber assembly, or about its void volume.

SUMMARY OF THE INVENTION

The present invention is a foraminous, fibrous membrane intended for permanent burial in the soil as a barrier against termites and other subterranean pests. The membrane of the invention comprises an assembly of fibers or filaments, wherein the assembly has an average void volume of less than 85% when measured under a pressure of 10 kPa (1.45 psi), and the average fiber size is smaller than 6 denier, and whose fiber surfaces within the assembly are coated with an insecticidal substance after the membrane has been deployed in an excavation or the like prior to the construction of a building therein.

The fiber assembly may be made up of a web of staple fibers o of continuous filaments. It may be spun bonded or melt blown, and may be consolidated to the above-noted working density range (average void volume less than 85%) by needling, hydroentangling or simple calendering. Preferably, the fibers are of a synthetic polymeric resin, but ceramic or metallic fibers may be used to satisfy especially demanding environmental conditions. Assemblies of mixed fiber types are also embraced within the scope of the present invention in order to permit management of web properties and to control the ultimate price.

The present invention will now be described in more complete detail with frequent reference being made to the figures identified below.

DETAILED DESCRIPTION OF THE PREFERRED EMBODIMENT

The invention described in International Patent Publication No. WO 90/14004 is said to include a blanket which may be of any material capable of absorbing liquid pesticide or pest repellant, and which is sufficiently durable to remain intact in situ for the life of the building or article to be protected. The blanket may be made of any of a number of absorbent materials of a generally fibrous nature, and should be rot-resistant.

However, subsequent research into the issues that must be considered in the production of an optimally functional, durable, and economically producible fiber assembly has indicated that a workable foraminous, fibrous membrane is characterized by a narrow and specific set of design parameters. Such a membrane is the subject of the present invention.

Figure 1:
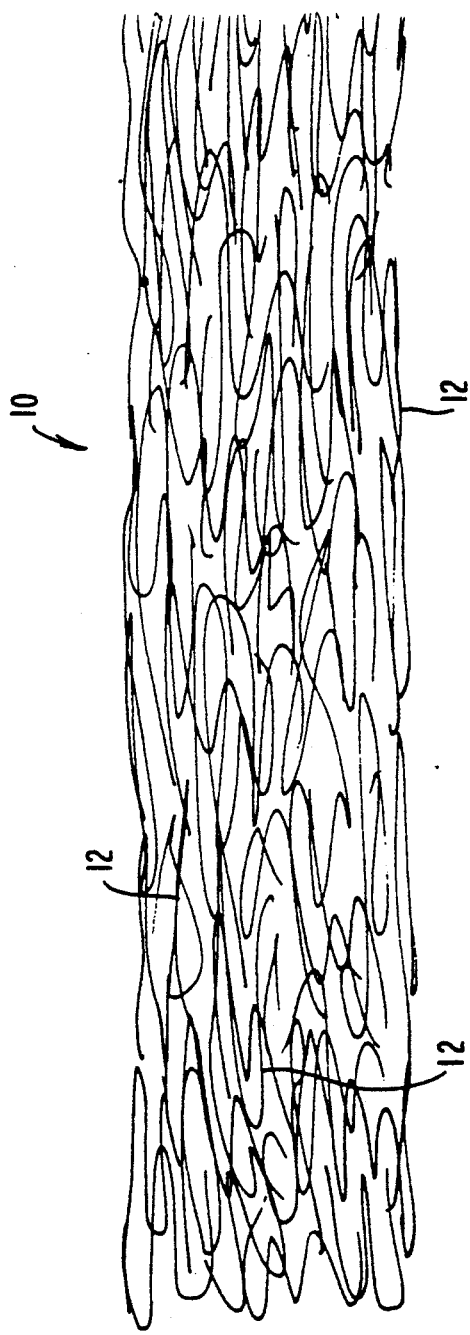
FIG. 1 is a cross-sectional view ofthe foraminous, fibrous membrane or assembly of the present invention.

FIG. 1 is a cross-sectional view of the foraminous, fibrous membrane or assembly 10 of the present invention. The assembly 10 comprises a plurality of fibers or filaments 12 consolidated by needling, hydroentangling or simple calendering.

Some of the specific issues that arise in the design of an optimal membrane structure will be discussed below.

The principle structural parameters that affect the mechanical properties of a fiber assembly are the fiber diameter and the assembly density. It is customary to express the size of textile fibers and filaments in terms of denier, which is defined as the weight, in grams, of 9000 meters of the fiber. The relationship between the denier, D, and the diameter, d, in centimeters, for a fiber with a density $p_f$ gms/cc is:

$$D = (\pi d^2 \times 9 \times 10^5 \times p_f)/4$$

The assembly density is expressed as fiber volume fraction $v_f$ or as its related complement percentage void volume, $V_v$. These parameters are elated through the expression:

$$V_f = 1 - (V_v/100)$$

It is often revealing and informative to examine the performance requirements of fiber assemblies in terms of a mapping of these two parameters. Since the fiber denier can vary over several orders of magnitude, while the volume fraction is constrained to be within the range $0 < v_f < 1$, it is best to plot this map in a semi-logarithmic manner, with the axis representing fiber denier being logarithmic and the axis representing assembly fiber volume fraction being linear. A typical plot of this type is shown in the FIG. 2. The shaded area in the plot represents the parameters of the fiber assemblies of the present invention, that is, average fiber size smaller than 6 denier and average void volume less that 85%.

The surface area of fiber per unit of assembly volume is of direct importance since it will determine the amount of insecticidal material that can be incorporated into the assembly. If the insecticidal material is deposited from solution or suspension to form a coating on some or all of the fiber surfaces, then the larger the assembly fiber surface area the more active ingredient can be deployed. In a devi designed for temporary or short term use there is no particular virtue in incorporating sufficient insecticidal material to ensure longevity, but where a permanent barrier is required, as in the present membrane material, there is a strong motivation to increase the surface area of the assembly as much as is practical. The surface area/unit volume of assembly, A, is given by:

$$A = 3.36 \times 10^3 v_f (p_f/D)^{\frac{1}{2}}$$

Figure 2:
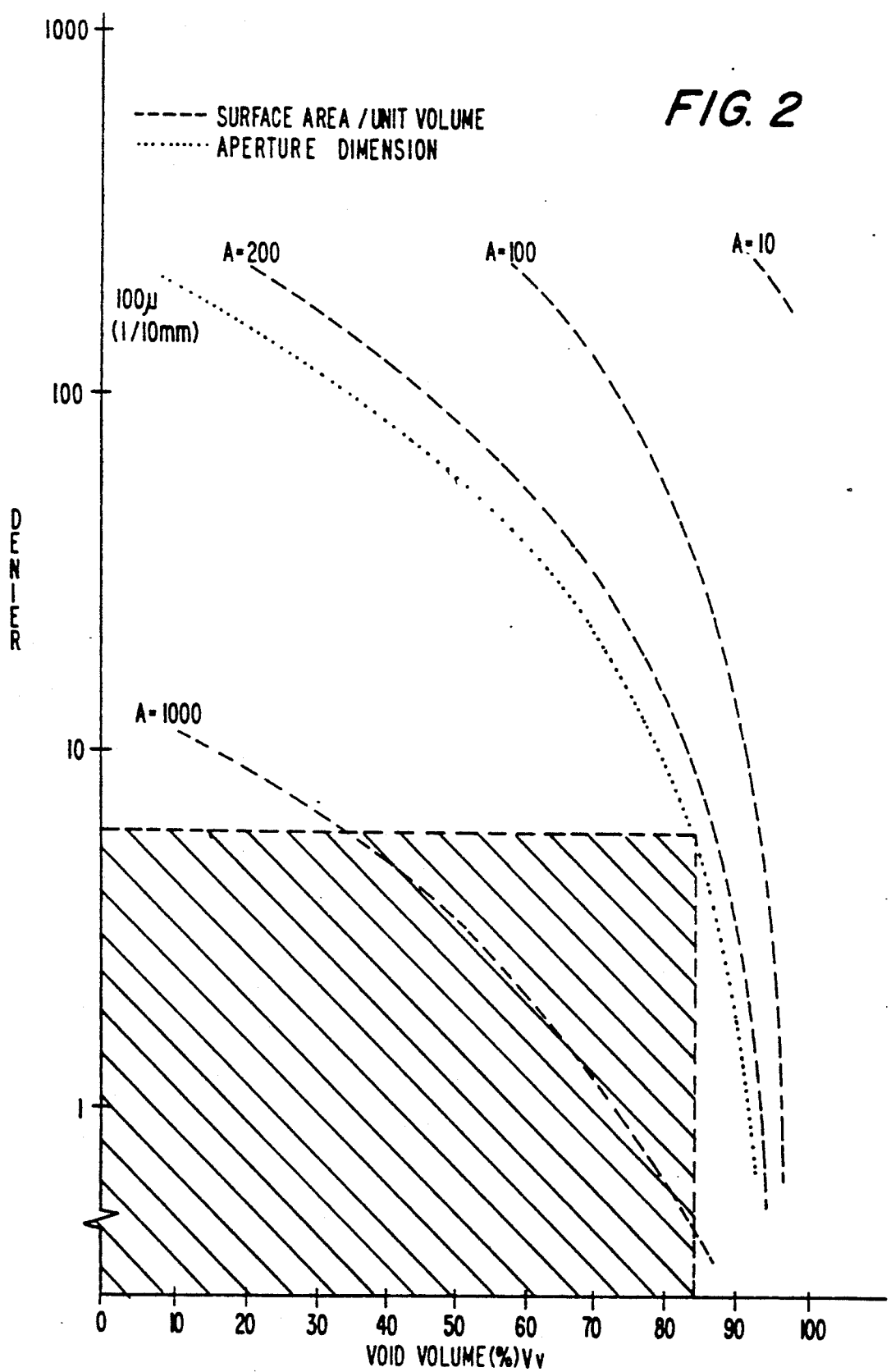
FIG. 2 is a semi-log plot of fiber denier against void volume for the fiber assembly included in the present invention.

In FIG. 2, a family of curves indicating those assemblies having certain constant values of surface area have been plotted. It is immediately apparent that large surface area assemblies are found in the lower left hand portion of the plot. Note that these lines are for assemblies of constant area per given volume of assembly. Where one desires to maximize the available area for a given weight of fiber, in order to optimize the economics of the textile component of the product, one must move to the right along the lines of constant area.

The second parameter that we have plotted is the average aperture dimension. It can be shown that the average distance L between crossing elements in a random assembly of fibers is given by:

$$L = 6.23 (D^{\frac{1}{2}}/v_f) \text{ micrometer,}$$

and the dotted line in FIG. 2 represents the family of assemblies having a constant value of 100 micrometers for this parameter, which is related closely to the average aperture dimension. As may be seen, the line for 100-micrometer sized apertures (1/10 mm) curves through the center of the plot, and grazes the upper right hand corner of the rectangular area specified by the present invention. Any assembly lying above this line will have average apertures greater than this size, which is commensurate with the size of very small insect pests. The pesticidal blanket of the present invention, in contrast, is specifically designed to offer resistance to penetration by insects, and the maximum aperture size limit of just above 1/10 mm (100 $\mu$), which is set by the conditions in the upper right hand corner of the area defined by the current specification, guarantees such resistance, since the termites are considerably larger than such a maximum aperture.

The mean aperture size has a profound influence on another important characteristic of the assembly, particularly if it is employed in the mode described in International Patent Publication No. WO 90/14004. There, the blanket is dry when it is deployed and is subsequently saturated with insecticidal solution or suspension. In order to avoid the immediate depletion of the saturated blanket by capillary transport to the adjacent soil layers, it is necessary to ensure that a considerable fraction of the interstices of the blanket are smaller than those of the soil, and this can best be achieved by utilizing fine fibers in a dense assembly—that is, by moving down toward the lower left hand quadrant of the figure. It is also a matter of experience that such assemblies will show a beneficial combination of conformability and damage resistance, which will lead in turn to satisfactory performance on a building site.

Figure 3:
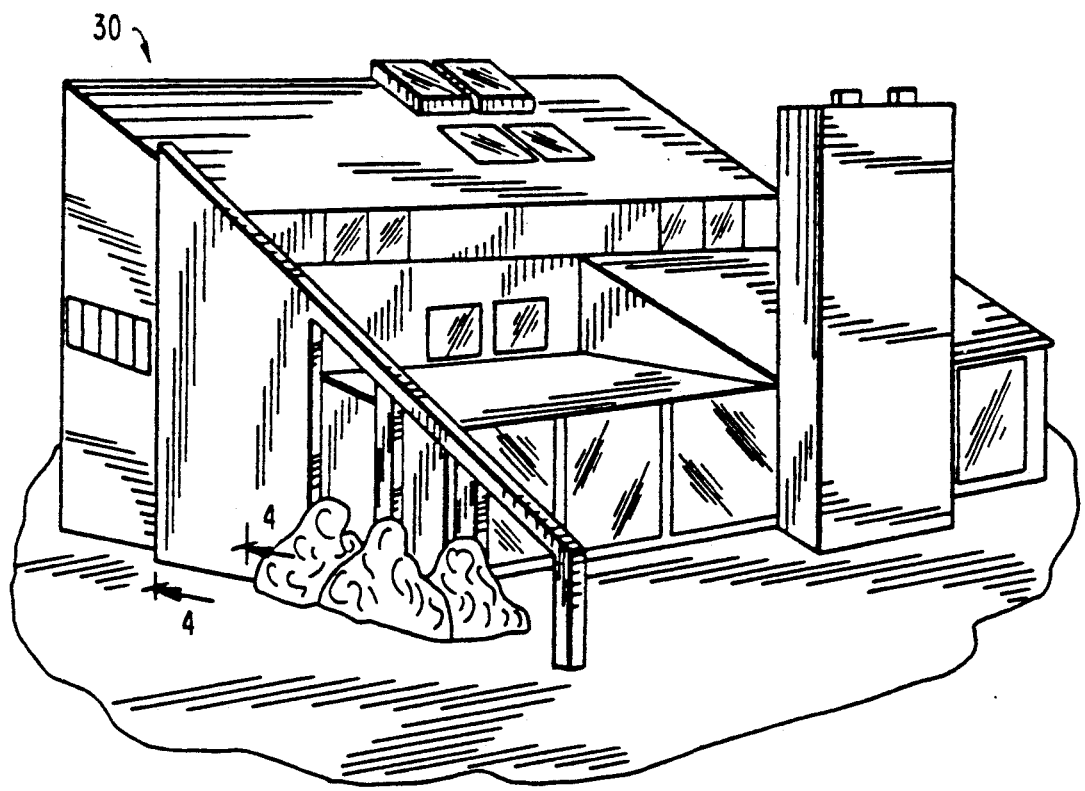
FIG. 3 is a perspective view of a building beneath which the present invention may be used.
Figure 4:
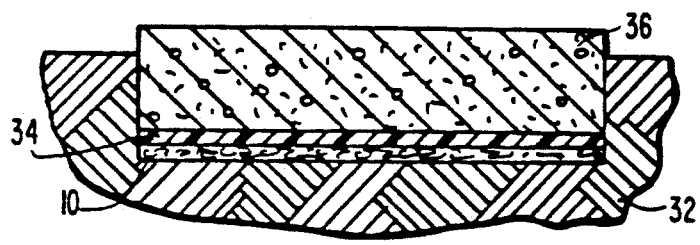
FIG. 4 is a sectional view showing the foraminous, fibrous membrane or assembly of the present invention in its ultimate position of use beneath a building to be protected from subterranean insect pests.

FIG. 3 is a perspective view of a building 30 beneath which the present invention may be used. FIG. 4 is a sectional view showing the foraminous, fibrous membrane or assembly 10 of the present invention in its ultimate position of use beneath a building 30 to be protected from subterranean insect pests. The assembly 10 is installed in an excavation prior to the construction of a building 30 therein. In FIG. 4, the assembly 10 is placed on the soil 32 in the excavation. A sheet of plastic 34 is then placed atop the assembly 10, and a concrete foundation slab 36 poured thereon. The building 30 is then constructed on the slab 36.

Modifications to the above would be obvious to tho skilled in the art, and would not bring the device so modified beyond the scope of the appended claims.

What is claimed is:

1. A foraminous, fibrous membrane for permanent burial inthe soil at a building site as a barrier against termites and other subterranean pests, said formainous, fibrous membrane being impregnated with an insecticide, said membrane comprising an assembly of fibers, said fibers having an average size smaller than 6 denier, and said assembly having an average void volume of less than 85% hen measured under a pressue of 10 kPa (1.45 psi), said assembly having an average distance between fiber crossing points less than 100 micorns (0.1 mm), whereby said termites and other subterranean pests are prevented from entering therein.

2. A foraminous, fibrous membrane as claimed in claim 1 wherein said assembly comprises fibers of a synthetic, polymeric resin.

3. A foraminous, fibrous membrane as claimed in claim 1 wherein said assembly comprises ceramic fibers.

4. A foraminous, fibrous membrane as claimed in claim 1 wherein said assembly comprises metallic fibers.

* * * * *